United States Patent
Chaimberg et al.

(10) Patent No.: US 12,416,396 B2
(45) Date of Patent: Sep. 16, 2025

(54) TRIMLESS RECESSED LIGHT FIXTURE

(71) Applicant: GLOBE ELECTRIC COMPANY INC., Montreal (CA)

(72) Inventors: Adam Chaimberg, Hampstead (CA); Scott Blaise Tylicki, Bowling Green, KY (US); Miles William McDonald, Bowling Green, KY (US)

(73) Assignee: GLOBE ELECTRIC COMPANY INC., Montreal (CA)

( * ) Notice: Subject to any disclaimer, the term of this patent is extended or adjusted under 35 U.S.C. 154(b) by 0 days.

(21) Appl. No.: 18/658,396

(22) Filed: May 8, 2024

(65) Prior Publication Data

US 2024/0288152 A1 Aug. 29, 2024

Related U.S. Application Data

(63) Continuation of application No. 18/121,921, filed on Mar. 15, 2023, now Pat. No. 12,007,102.

(60) Provisional application No. 63/320,312, filed on Mar. 16, 2022.

(51) Int. Cl.
| | |
|---|---|
| *F21V 21/04* | (2006.01) |
| *F21S 8/02* | (2006.01) |
| *F21V 23/06* | (2006.01) |
| *F21V 29/70* | (2015.01) |
| *F21Y 115/10* | (2016.01) |

(52) U.S. Cl.
CPC ............ *F21V 21/04* (2013.01); *F21S 8/02* (2013.01); *F21V 23/06* (2013.01); *F21V 29/70* (2015.01); *F21Y 2115/10* (2016.08)

(58) Field of Classification Search
CPC .......... F21V 21/04; F21V 23/06; F21V 29/70; F21V 7/041; F21V 17/164; F21V 3/00; F21S 8/02; F21S 8/026; F21Y 2115/10; F21Y 2107/10; G02B 6/0091
See application file for complete search history.

(56) References Cited

U.S. PATENT DOCUMENTS

| | | |
|---|---|---|
| 2010/0002451 A1 | 1/2010 | Reynolds |
| 2011/0007506 A1 | 1/2011 | Kinoshita |
| 2011/0110096 A1 | 5/2011 | Hong et al. |
| 2015/0043224 A1* | 2/2015 | Chen ............... F21V 31/005 362/365 |
| 2015/0176821 A1 | 6/2015 | Vogt et al. |

(Continued)

*Primary Examiner* — Evan P Dzierzynski
(74) *Attorney, Agent, or Firm* — Gray Ice Higdon

(57) ABSTRACT

The present disclosure is directed towards an LED based trimless recessed light fixture wherein the outermost diffuser lens of the recessed fixture provides illumination and extends outward covering the entire ceiling aperture. No additional decorative trim elements or baffles are required and the diffuser lens both illuminates and covers the ceiling aperture to provide a smooth illuminated unitary appearance. This outermost diffuser lens is illuminated from above by a illumination system which includes a ring support on which the LEDs may be mounted, along with an optical stack which collects light output from the LEDs and both illuminates and redirects the light through the outermost diffuser lens. This outermost diffuser lens provides appearance of smooth continuous illumination output along its entire surface and while also covering aperture edges formed in the ceiling for the recessed fixture.

20 Claims, 14 Drawing Sheets

(56) References Cited

U.S. PATENT DOCUMENTS

| | | | |
|---|---|---|---|
| 2016/0033111 A1* | 2/2016 | Thraen | F21V 15/01 |
| | | | 362/310 |
| 2017/0363261 A1* | 12/2017 | White | F21V 23/008 |
| 2020/0191344 A1* | 6/2020 | Van Winkle | F21V 5/04 |
| 2020/0370731 A1* | 11/2020 | DeBow | B32B 27/308 |
| 2022/0010954 A1* | 1/2022 | Feit | G02B 5/08 |
| 2022/0065410 A1* | 3/2022 | Huang | F21V 23/008 |
| 2022/0082244 A1* | 3/2022 | Lupien | F21V 25/12 |
| 2023/0296229 A1 | 9/2023 | Chaimberg et al. | |

\* cited by examiner

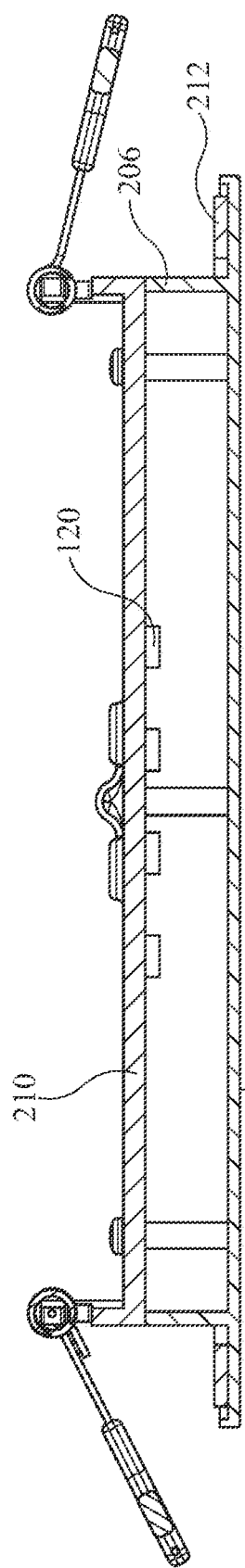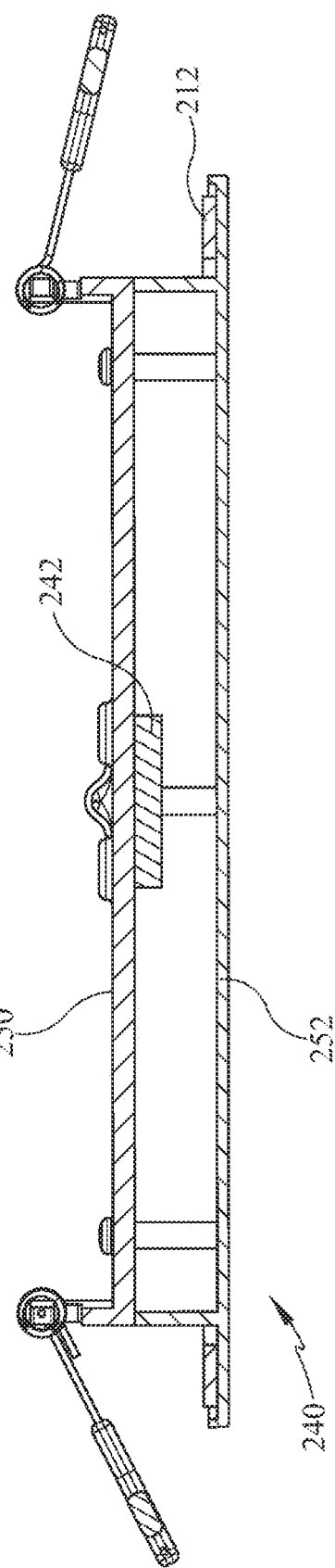

TRIMLESS RECESSED LIGHT FIXTURE

BACKGROUND

Recessed lighting positioned within the ceiling is frequently utilized for illumination purposes within commercial and residential areas. These lights are positioned within a ceiling aperture, frequently within an inverted "can" that is mounted above the ceiling line and providing a power connection to a local power supply through a junction box. These recessed can lights normally come with replaceable lamps retained within the can and connected to the power supply. The can mounted above a ceiling aperture can also include a reflector around the lamp or light source to direct emitted light downward through the can and ceiling opening and into the residential or commercial space. The recessed fixture is normally held into place using hangar bars and comes with other associated hardware to properly illuminate the space directly below the light. This hardware includes the electrical socket, associated wiring harness, reflectors, baffle or trim pieces along with other specialized hardware for particular applications. To make the recessed light visually appealing and thereby prevent an unfinished appearance of the hole cut into the ceiling, recessed lights also normally include a metal or plastic trim piece which surrounds the ceiling aperture and extends upward into portions of the can to snap or fit into place and cover the edges of the aperture. This added trim piece is held into place by mechanical structures integrated with the fixture and or it may be an extension of a baffle extending into the light fixture. This trim piece is non-illuminating and extends outward from the baffle of the fixture away from the can opening to provide a finished look to the fixture.

SUMMARY

The present disclosure is directed towards an LED based trimless recessed light fixture wherein the outermost diffuser lens of the recessed fixture provides illumination and extends outward covering the entire ceiling aperture. No additional decorative trim elements or baffles are required and the diffuser lens provides illuminates and covers the ceiling aperture to create a smooth illuminated unitary appearance. This outermost diffuser lens is illuminated from above by an illumination system which includes a ring support on which the LEDs may be mounted, along with an optical stack which collects light output from the LEDs and both illuminates and redirects the light through the outermost diffuser lens. This outermost diffuser lens provides the appearance of smooth continuous illumination output along its entire surface and while also covering the aperture edges formed in the ceiling for the recessed fixture. However, while aspects depict and support ring and diffuser and/or lens, any shape implementation may incorporate features disclosed herein and the specific geometric construction is not meant to be limiting as it is provided only for explanatory purposes.

In further implementations, the recessed light fixture is characterized by an outer diffuser lens which has a size greater than the ceiling aperture size which it covers and wherein the outer diffuser lens is positioned flush against the ceiling while being fully illuminated by the light sources above it and within or above the ceiling aperture. In such embodiments, the outer diffuser lens sits directly against the ceiling surface and in some alternative embodiments this outer diffuser lens includes an interposed gasket circumscribing the ceiling aperture.

Aspects of the present disclosure further include an outer diffuser lens which extends along the ceiling surface and which has a diameter which is wider than the recessed light ceiling aperture. This outer diffuser lens is continuous and is retained and illuminated from above by the plurality of LEDs arranged along the inner periphery of a ring support or wall housing. The LEDs mounted on the ring support emit light into a light guide which is supported by the ring support and which redirects light downward through the outer diffuser lens. The light guide can be a part of an optical stack which may include both a reflector above the light guide to reflect light downward back through the light guide, and also include an optional interior diffuser directly below the light guide, the light guide positioned between the reflector and the optional interior diffuser. The optical stack, or elements thereof, may be supported by the ring support along an inwardly directed ledge of the ring support. Light emitted by the LEDs is thus collected by the optical stack or portions thereof and redirected through the outer diffuser lens, illuminating the outer diffusing lens and allowing light to project into the interior of the room, the trimless light fixture having a continuous illumination lens exposed on the interior side of the ceiling without any visible additional hardware or other structure.

These and other features may be incorporated alone or in combination with additional features. For example, in some implementations, the presently disclosed recessed light fixture includes an outer lens having a first diameter, a ring support affixed to a first side of the outer lens and having a second diameter less than the first diameter, the ring support having an inner surface supporting a plurality of LEDs, the ring support having an inwardly directed ledge; an optic stacked on the inwardly directed ledge, the optic including: a diffuser, a light guide, and a reflector. The fixture may further include a construction where the plurality of LEDs are positioned on the inner surface in optical alignment with the light guide and wherein the reflector redirects light from the light guide through the diffuser and wherein the ring support having at least one retention mechanism.

In some variations, the ring support is a circular ring support. In other variations, the ring support may be alternative geometric configurations. For example, the ring support may be square, rectangular, conical or triangular. In still further implementations, the ring support may incorporate intermittent wall portions. In some embodiments as well, the plurality of LEDs may be regularly positioned circumscribing the ring support and directed towards the optical stack. These LEDs, in addition, may be connected to an LED micro-controller as well as a remotely positioned power supply. Of course, the power supply may be on board as well in some implementations.

In some implementations, the LEDs may be connected to a power bus which electrically connects the LEDs together and which extends around the periphery of the ring support. The electrical power bus may extend, in aspects, along the inner surface of the ring support but in other implementations it may extend along another portion of the recessed light fixture. For example, the power bus may extend along the top wall or along any portion of the fixture.

In even further implementations, the fixture may include an optic stack which has multiple elements, each of the elements are connected together by an adhesive. For example, the optic stack may include a reflector and a light guide. In even further examples the optic stack may include other structures, such as an optical diffuser. In still further aspects, the elements of the optic stack may be formed in an integral optical piece which performs all of the functional elements of the reflector and light guide as well as any other desired functionality.

In still further implementations, the light guide may include light extraction features which redirect light outward through the outer diffuser. In some implementations, these light extraction features can be embedded within the light guide. In other implementations they can be indentions or other physical features formed along the light guide to redirect, reflect or modify the light output of the light guide.

In some implementations, the ring support may be integral with the light guide or with the outer diffuser lens. For example, the outer diffuser lens may be constructed together with the light guide so that they form an integrated unitary element. In still further implementations they could be separately adhered together to form an integrated element.

In still further design aspects, the ring support may be constructed of a heat conductive material and acts as a heat sink for the plurality of LEDs. Further, the ring support may in various implementations include a top cover or plate which is retained on the ring support.

In still further embodiments, the outer lens may have a plurality of retention pegs extending towards the ring support, wherein the ring support has a plurality of receiving brackets for those pegs. Each of the brackets and pegs work together to retain the top cover to the ring support. Such retention may be either semi-permanent with screws, one-way pegs and brackets, or simply frictional retention where they may be pulsed part from each other.

In still further implementations, the recessed light fixture may be a retro-fit wherein the electrical connection is to the screw-in bulb type electrical connection. In still further alternatives, this electrical connection may be directly to a junction box. For example, in a new installation, a junction box may be the electrically connected directly to the power supply box. In even further implementations, the recessed light fixture may be connected to the junction box which may, in alternative embodiments, be positioned over the ceiling aperture.

In aspects, the recessed fixture may include a micro-controller which controls the light output characteristic of the plurality of LEDs. Additionally, or alternatively, the micro-controller may control the LEDs individually or in unison or in groups. In still further implementations, the light output characteristics controlled by the micro-controller may be luminosity or intensity, color temperature, duration or any of a number of controllable light output characteristics, singularly or in combination.

In even further implementations, the recessed light fixture may include direct back-lit illumination of the outer lens diffuser. In such implementations, the LEDs may be placed against the top wall and directed towards the outer diffuser. These LEDs may be, in some embodiments, a plurality of LEDs or may be a COB type of LED system.

For example, in some implementations the trimless light fixture may include multiple features including an outer diffuser having a first diameter wherein a ring support receives the outer diffuser along a ring support rim. The ring support may extend downward from a top wall to the ring support rim and both the ring support rim and the top wall may be annular. The top wall may also include an inner surface supporting at least one LED emitting light directed towards the outer diffuser.

In some examples, the ring support rim may have a first diameter and the top wall having a second diameter, the second diameter less than the first diameter. The various examples may also include implementations of a conical reflector extending away from the top wall to the ring support rim, the conical reflector extending downward to a flat outer rim. In other examples, the flat outer rim of the conical reflector may be positioned between the ring support rim and outer diffuser.

The LEDs may be positioned along the inner surface of the top wall to emit light through the outer diffuser. The outer diffuser may further include a snap bead to retain the outer diffuser to the ring support, the snap bead fitting over the ring support rim. In some of these examples the ring support rim may be annular receiving a circular or annular diffuser.

These and other features may be included with additional aspects alone or in combination. For example, the diffuser may also include having a circumferential gasket, the circumferential gasket of the outer diffuser positioned to abut a ceiling surface; where the gasket is configured for positioning about a ceiling aperture which receives the ring support.

In still further implementations, the trimless recessed light fixture may have a conical reflector which extends from the annular top wall to the annular ring support rim wherein the ring support is an circular or annular side wall, the annular side wall angled from the top wall downwardly to the ring support rim.

As used herein for purposes of the present disclosure, the term "LED" should be understood to include any electroluminescent diode or other type of carrier injection/junction-based system that is capable of generating radiation in response to an electric signal and/or acting as a photodiode. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

As used herein, the term "diffuser" is utilized to represent various constructs. For example, a diffuser generally can mean any structure placed in the light output path that diffuses or scatters the light. At times, the diffusion and/or scattering of light can create a softer light output. Soft light may be generated by preventing the visibility of a singular points of light. A lens may be used to converge or diverge light from the light source. At times, these terms may be used interchangeably or in combination to represent an optical construct which may do any combination or single aspect of any of these described features.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

FIG. 9 is a side sectional view of an additional embodiment of the present disclosure.

FIG. 10 is a side sectional view of a further embodiment of the present disclosure.

DETAILED DESCRIPTION

Figure 1:
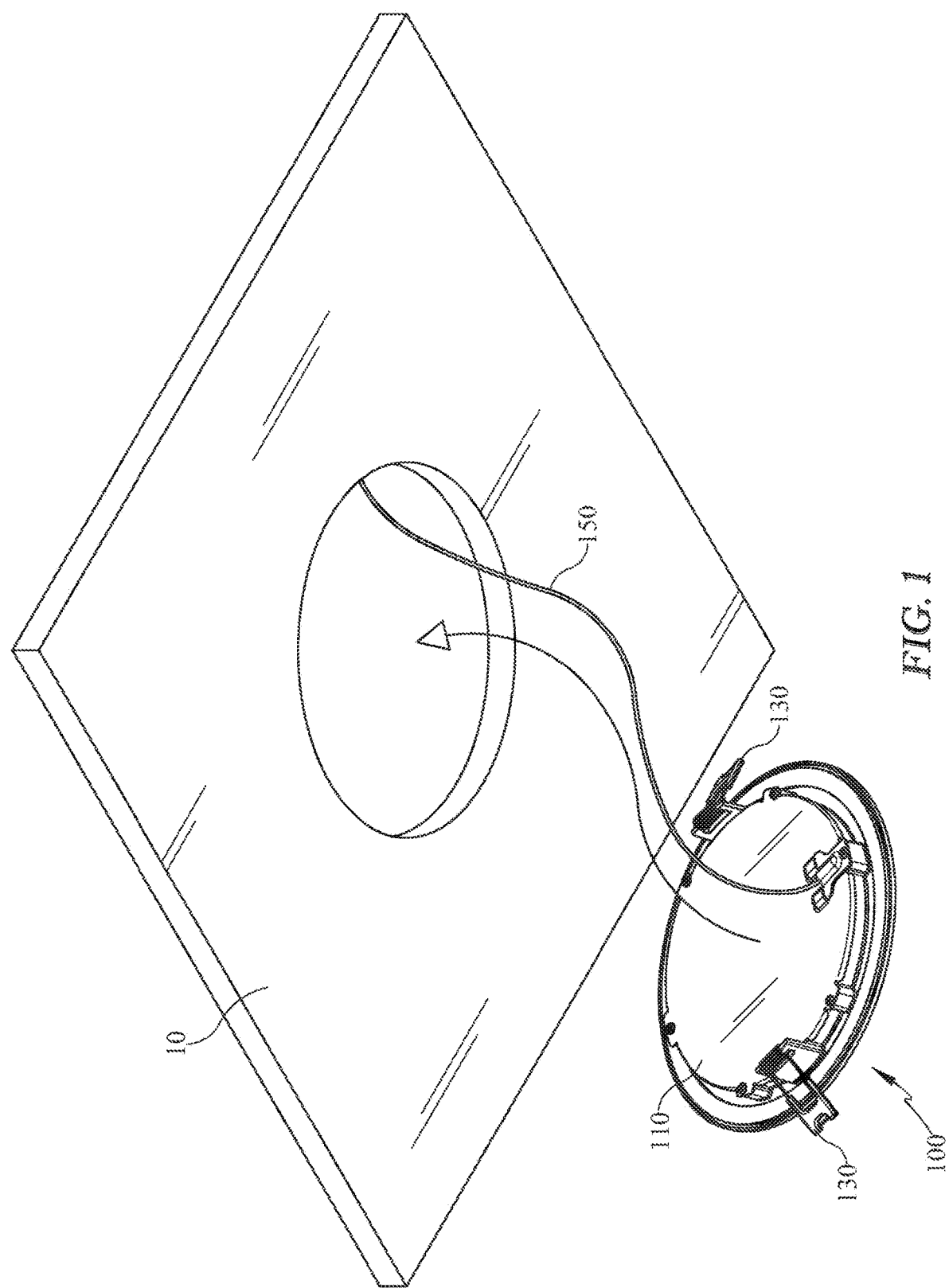
FIG. 1 is a lower interior view from within a room and below the installed ceiling of the assembled trimless recessed light fixture, according to an embodiment of the present disclosure.

As depicted in the figures, wherein like numbers denote like parts throughout the several views, a trimless recessed light fixture 100 is depicted in multiple embodiments. The trimless recessed light fixture 100 is shown in FIG. 1 below an aperture in a ceiling surface 10. The light fixture 100 is shown with an attached power and communication line 150 which extends to a micro-controller and power supply housing 151 which contains at least LED and other lighting control circuitry, power supply circuitry and communication handling. The trimless light fixture is inserted through the aperture of the ceiling 10 such that the spring clips 130 are utilized to retain the fixture above the ceiling through friction within a recessed can housing structure or directly compressing against the ceiling as shown in the various embodiments. The outer diffuser lens remains visible on the interior side of the ceiling and is illuminated from the LEDs of the fixture allowing the outer diffuser lens to provide a neat, continuous and illuminated structure which covers the edge of the ceiling aperture.

Figure 2:
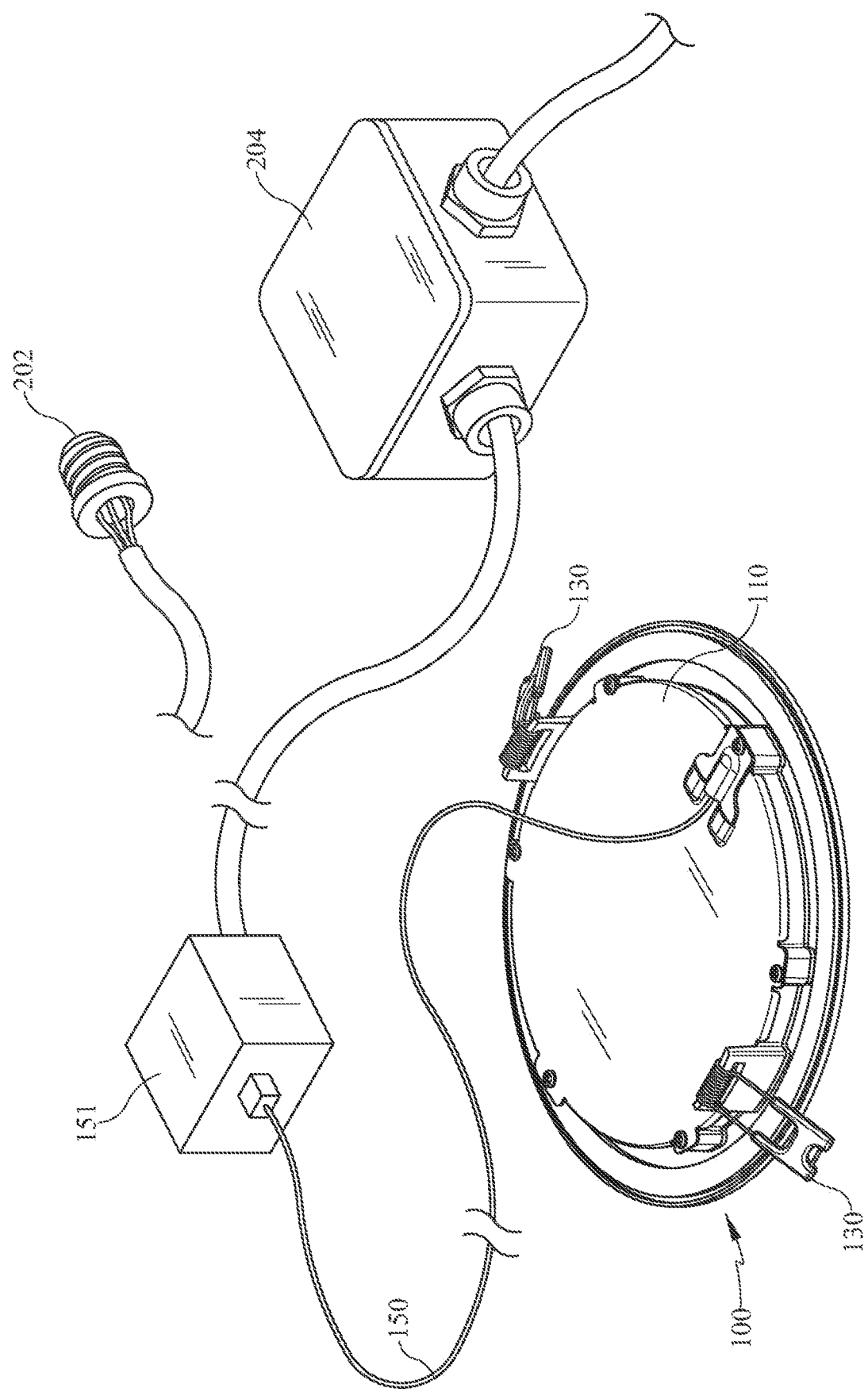
FIG. 2 is an upper perspective view of the trimless recessed light fixture and exemplary electrical connections according to some embodiments of the present disclosure.

In FIG. 2, the trimless recessed light fixture 100 is shown wherein the power and communication line 150 is connected to the micro-controller and power supply housing 151 which itself is connected to either a junction box 204 or to a screw-in type light bulb electrical connector to supply electricity to the fixture.

As shown in the figures, an aperture is formed in the ceiling 10. The trimless recessed light fixture is connected to an electrical source via power line 150 supplying electrical connectivity to a power source housing 151. The power line 150 as well may provide electronic communication and control signals to the LEDs from at least one associated micro-controller within power supply housing 151. The power source and control housing 151, depicted in FIG. 2, may contain at least the at least one micro-controller/microprocessor and other associated electronics which regulate current flow, light characteristics and other related signals to the plurality of LEDs positioned in the trimless recessed lights fixture 100. The power supply and control housing may also contain the necessary electronics for modification of the power supply to the LEDs, driver circuits, AC/DC conversion and any other necessary circuits and electronics to maintain appropriate voltage to the plurality of LEDs, control the level of output and characteristics of light output and other lighting control signals. For example, the power supply housing 151 may include at least AC/DC converters, voltage and current smoothing, modulation circuitry and the like. For example, pulse width, amplitude or frequency modulation may be implemented by circuitry of the housing 151. Of course any aspects of these electronics may be shared between the housing 151 and the light fixture 100 depending on design constraints, heating and LED control requirements. The aperture formed in the ceiling 10 receives the light fixture 100 after connecting the light fixture 100 to the power supply housing 151 and is maintained in place within the aperture by virtue of the springs 130.

As shown in FIG. 2, connectivity to an electrical power source may be through a number of differing connections which may include direct electrical connection to line voltage at a junction box 204. In some embodiments, connection may be made as in a retrofit installation to a type A Edison style screw-in bulb electrical connector as depicted in the figures as 202. Also depicted is an alternative embodiment of a new installation wherein instead of connecting to a pre-existing screw-in type connection, a new connection may be made from the power supply 151 to a junction box 204. These different types of electrical connections are available and allow for the functionality described herein to be implemented in either installation. The descriptions included herein are not limiting for providing a particular type of electrical connectivity to the fixture 100. Variable electrical connectivity allows the light fixture to be connected to a power supply 151 while also allowing for variability of installation electrical type and location. Therefore, in one environment, a junction box 204 may be provided and in others, retrofit capability may be provided. Further implementations are available as well such as direct DC connect to a DC provided power source.

Figure 3:
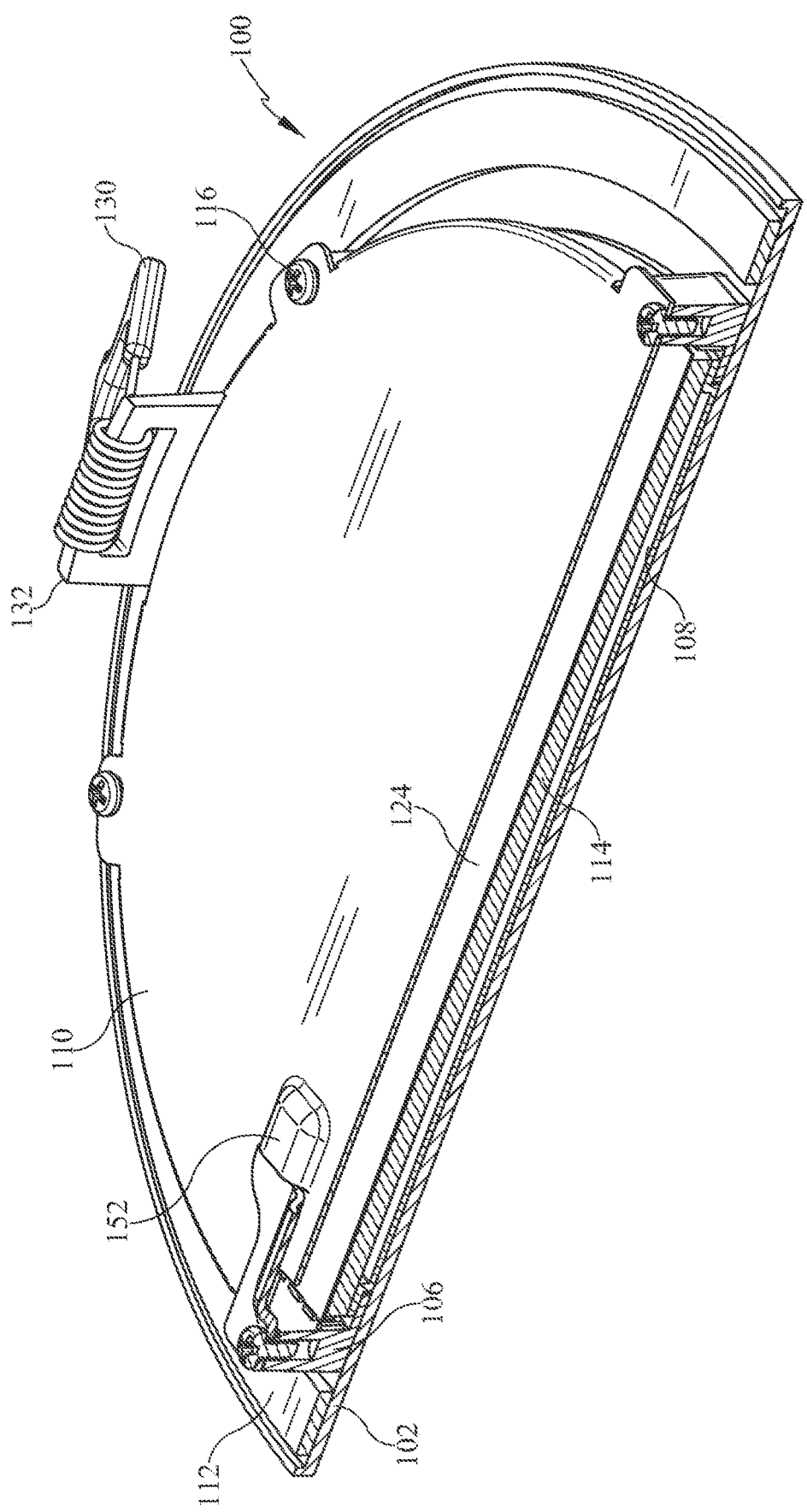
FIG. 3 is an upper perspective sectional view of an embodiment of the present disclosure.

As shown in FIG. 3, elements of the trimless recessed light fixture 100 are depicted in the disclosed and displayed embodiment. The light fixture 100 includes a ring support or cylindrical wall housing 106 which may form a primary structure for the light fixture 100 in regards to installation and support of associated hardware. Ring support 106 in some implementations may allow for the application of LED dies on the surface thereof. In some implementations, the ring support may be aluminum and the LED dies may be circumferentially spaced regularly along the interior wall to direct the LEDs towards other associated optics of the light fixture 100. The ring support 106 may also act as a heat sink in such implementations to draw heat away from the individual LED dies, while also providing good structural support for associated LED electronics such as drivers, power supply lines, sensors and the like. The number of attached LEDs is dependent on a number of criteria, including desired light output intensity, color requirements, power supply and heat limitations, as well as positioning of the associated optical stack to which the LEDs direct light.

While the ring support 106 in multiple examples depicted herein is cylindrical, many different geometric configurations may be implemented using the features outlined. For example, instead of a cylindrical ring support, partial cylindrical, ellipsoidal, square, rectangular, triangular or other configurations may be made with matching support ring type configurations. Hence, while the exemplary description is set forth as a cylindrical wall housing or ring support 106 is depicted, in actuality many different types of outer lenses and ring supports may be provided. For example, in some embodiments the outer diffuser lens 102 may be square and the ring support 106 may be partial wall segments. Similarly, these structures do not need to match in configurations. For example, the outer diffuser lens 102 may be round and the ring support may be simple abutments, square corners or posts supporting the other structural elements. Any such combination of configurations may be implemented based upon the disclosure hereof.

The ring support 106 may also attach to an outer diffuser lens 102 using various attachment mechanisms disclosed herein. For Example, the ring support 106 may allow the outer lens 102 to be removably insertable within or to the ring support structure. Ring support 106 may also be mechanically attached to the outer lens 102 by screws or other fasteners. In still further options, the ring support 106 and the outer lens may be integral so that no interconnection elements or mechanisms are required. For example, in some implementations, the outer lens 102 may be formed from a unitary piece with an upwardly extending ring support 106. In one such example, the ring support and the outer lens may be made of the same material. In still further examples, the outer lens 102 may be formed and integrated with a ring support 106 through adhesive, thermal welding, other means.

Ring support 106 also provide the support for the plurality of LEDs 120 as noted above, which are positioned on an inner peripheral sidewall of the ring support 106. The plurality of LEDs positioned on the inner sidewall are electrically connected to the microcontroller and power supply housing 151 via the power and communication line 150, which itself is connected directly to the light fixture by virtue of the socket connection 152. Socket connection 152 provides electrical connectivity to the plurality of LEDs through an electrical connection positioned on the ring support 106, or on an associated structural element, or simply by wired connectivity.

Ring support 106 also includes an ledge 107 in some implementations which extends inwardly from the inner side wall of the ring support and which provides a support surface for the optic stack 126. For example, the ledge 107 may be positioned on a lower edge of the ring support and extend inwardly, may be an intermittent structure which extends around the internal periphery, or may be interposed between the LEDs and a lower edge of the ring support. For example, in one embodiment the ledge 107 may be raised a bit and not be located on the lower edge of the ring support and may be intermittent structural abutments. The ledge as described herein is not meant to require a continuous structure nor is required to be integrated with the ring support. For example, the ring support may incorporate a drop down hangar assembly which depends from a top edge of the ring support and which properly positions the optical elements relative to the plurality of LEDs. Hence, the ledge, while shown in the one embodiment of the Figures, is not meant to be limiting as multiple other assemblies may be utilized to position the optical stack 126 in necessary optical alignment with the plurality of LEDs.

The optic stack 126 can optionally include multiple elements, combined functional elements or a single element, as opposed to the three distinct elements depicted. In the embodiments shown in FIG. 3 and FIG. 4, the optic stack includes a light guide 114 and an optical reflector 124 positioned on the top surface of the light guide 114. Optical reflector 124 allows for the redirection of light from the light guide downward through the optional diffuser 108 and then through the diffuser lens 102. In some embodiments, these elements may be separate layers of the optic stack. In other embodiments, they may be combined together into a single structural layer.

Figure 4:
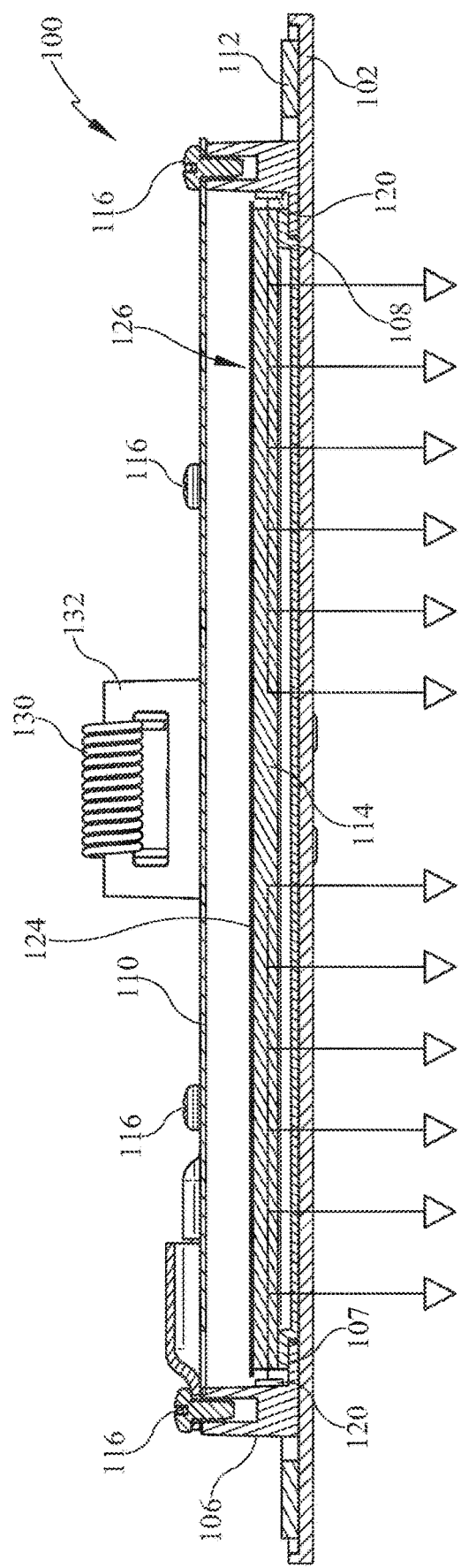
FIG. 4 is a side sectional view of an embodiment of the present disclosure.

Optical stack 126 as shown in the explanatory embodiments of FIGS. 3 and 4 has three structural elements to provide optical concentration and communication (light guide), control reflection (reflector 124) and light modification (optional diffuser 108). However, the optic stack may include more or less than all of the depicted features shown in these embodiments. In other words, the optical stack 126 may only include a light guide 114 which performs the function of redirecting the desired characteristic and amount of light from the LEDs 120. In the depicted embodiment, the reflector 124 is provided to maximize light output from the light guide and reduce losses of the LED luminosity. Further, optional diffuser 108 is not required but when included may be positioned below the light guide to modify the light output of the light guide and reflector or just of the light guide. The number of elements of the optical stack 126, position or order of the elements and functionality of the layers, if multiple layers are utilized, are discretionary depending on the light characteristics desired to produce as the light output of the light fixture 100.

For example, a light guide 114 may be utilized which includes many of the characteristics of the described combined optical stack. For example, various light guides may include facets, embedded reflective materials, features or other aspects which perform individual or combined optical modifications and/or reflection. These include light redirection, output diffusion, reflection, to name a few.

Light guide 114 is positioned on ledge 107 to receive light output from the LEDs 120. The light guide 114 is placed in optical alignment with the LEDs 120 so that light emitted from the LEDs enters the light guide and is modified according to the light guide design characteristics. As shown in FIG. 4, light guide 114 allows light to enter along the peripheral edge or circumferential light entry surface and redirects light through the light guide and downward through a light exit surface. The exemplary light guide 114 depicted is combined with a top layer reflector 124. For example, reflector 124 may be a metalized reflector or may be a reflective film attached to the top surface of the light guide 114. Other embodiments may incorporate features of the reflector directly within the light guide 114 such as reflective material, facets, interspersed edges, formations, depressions or other structural discontinuities.

An optional diffuser 108 is also shown below the light guide in order to further modify the light output from the light guide 114. Diffuser 108 is optional depending on the desired light output characteristics, characteristics of the light guide, LEDs, reflector, outer diffuser lens 102, or other installed elements. For example, diffuser 108 may be entirely removed and aspects of the light modification features, if needed, may be incorporated within diffuser lens 102 or within the light guide 114. For example, the light guide may be fitted with a lower integral layer of diffusion material to remove the pinpoint light source visibility. Diffuser 108, as shown in the embodiment of FIGS. 3 and 4 if installed, positions as a lower most element of the optical stack 126, which itself is supported on the ledge 107 of the ring support 106. Again, however, various supporting structures for the optical stack may be implemented herein.

In one depicted embodiment, for example, ring support 106 includes an inwardly directed ledge 107 which supports and holds the optical stack 126. Ledge 107 may be formed as an inward extension of the ring support. Other embodiments may be implemented to reduce or even remove the ledge. For example, the optical stack 126 may alternatively be supported from above from the top plate 110, from a top ledge or edge of the ring support 106, or simply designed to rest atop of the diffuser lens 102. The various structural elements necessary to provide support of the optical stack merely require that the light guide receive light input along a light entry surface from the light emitting elements, such as the LEDs. Hence, ring support and ledge 107 need to combine to appropriately position the LEDs and the light guide into optical communication.

The plurality of LEDs 120 may be positioned on the inner side wall of the ring support or cylindrical wall. The ring support may be metal, such as aluminum, which acts as a heat sink for the LEDs to draw heat away from the dies and distribute the heat through a larger surface area. The ring support 106 may also provide an electrical bus for interconnection of the individual LEDs concentrically positioned around the ring support. For example, an electrical interconnection line may be adhered to the inner side wall of the ring support or may be embedded in a channel of the ring support. For example, in some embodiments an electrical connection and control line may extend around the inner sidewall between each of the plurality of LEDs and then be connected directly to the socket 152 so that the power supply 151 and micro-controller effectively control the light output characteristics of the LEDs.

In some embodiments, the power supply and control housing 151 may contain controller electronics and power supply circuitry necessary to control signals communicated between the power supply housing 151 and the LEDs 120. For example, the electronics within the power supply housing 151 may accept standard 120V AC line voltage provided by the junction box 204 or other electrical connection and provide low voltage DC to the LEDs via the electrical connection 150. Power modification may also be included within the circuitry such as AC to DC conversion, PWM drivers, smoothing or chopping circuits as are known in the art to provide power controllable power to the LEDs. Various power control implementations may also be included within the power supply housing such as known modulation techniques, to appropriately control and modify the light output of the LEDs. The circuits and electronics within the housing 151 may further include AC to DC converters, capacitors, and other circuits with voltage and current modification techniques. Alternatively, controller electronics and power supply circuitry may include voltage modification and control based upon alternative electrical power supplies. For example, the connected power supply may be DC and not AC and the control circuitry may recognize the supplied power and automatically adjust the provided DC power to the LEDs. In implementations, the microcontroller electronics and power supply circuitry within the housing 151 may modify the received power supply and provide a regulated low voltage DC supply presented at the LEDs. These control circuits may also include known techniques in driving the LEDs for control of color mixing, dimming, LED addressing for individual controlled output and other similar power supply techniques.

In some embodiments, each of the LEDs may be individually addressable and controllable or may be controlled together in segments. For example, the power supply and control circuitry may control individual LED dies on the ring support to create optical effects, including dimming, color coordination and mixing, In still other examples, the LED dies may be segmented In some embodiments, LED drivers may be positioned directly with the LED dies on the inner side wall of the ring support. In yet other embodiments, the LEDs may include associated drivers exterior to the physical location of the dye.

Figure 4A:
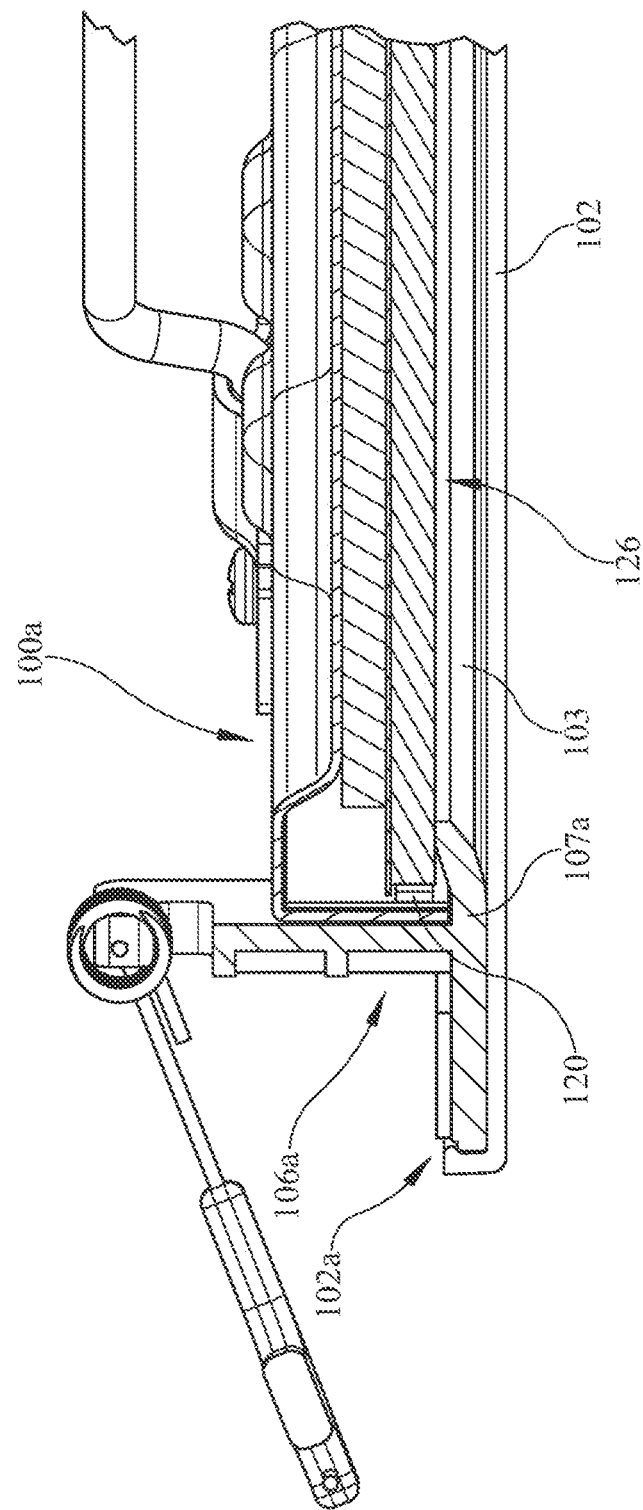
FIG. 4A is a side section view of an embodiment of the present disclosure.

The embodiments of FIGS. 3, 4 and 4A depict the light guide adjacent to and in optical alignment with the plurality of LEDs 120. Such alignment may be through physical alignment or may be accomplished using optical reflectors, optical fiber, optical funnels, lenses and similar light collection and transmission techniques. For example, in some embodiments the LEDs may emit light which is collected by a light collector and redirected to the optical guide light entry surface utilizing optical carrying fibers in order to more particularly control the light entry position. Still other implementations may utilize reflectors to position the light guide at a different vertical height relative to the LEDs, or to allow the LEDs to be mounted on alternative support surfaces while still accomplishing mostly downlight redirection of light output.

In implementations, the plurality of LEDs may utilize the ring support 106 as a heat sink. In still further embodiments, the ring support may be thermally conductive and transfer heat from the LEDs to other structures, such as to the top plate 110. In even further implementations, the ring support may be provided with additional brackets for receipt of screws 116 which adhere the top plate 110 to the ring support.

Figure 5:
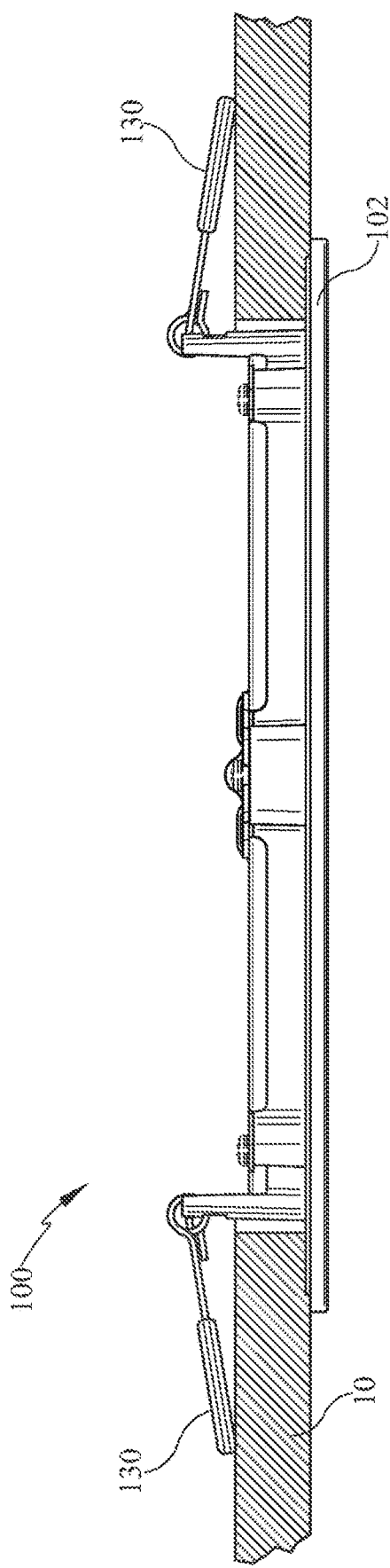
FIG. 5 is a side view of an installed embodiment of the present disclosure.
Figure 7:
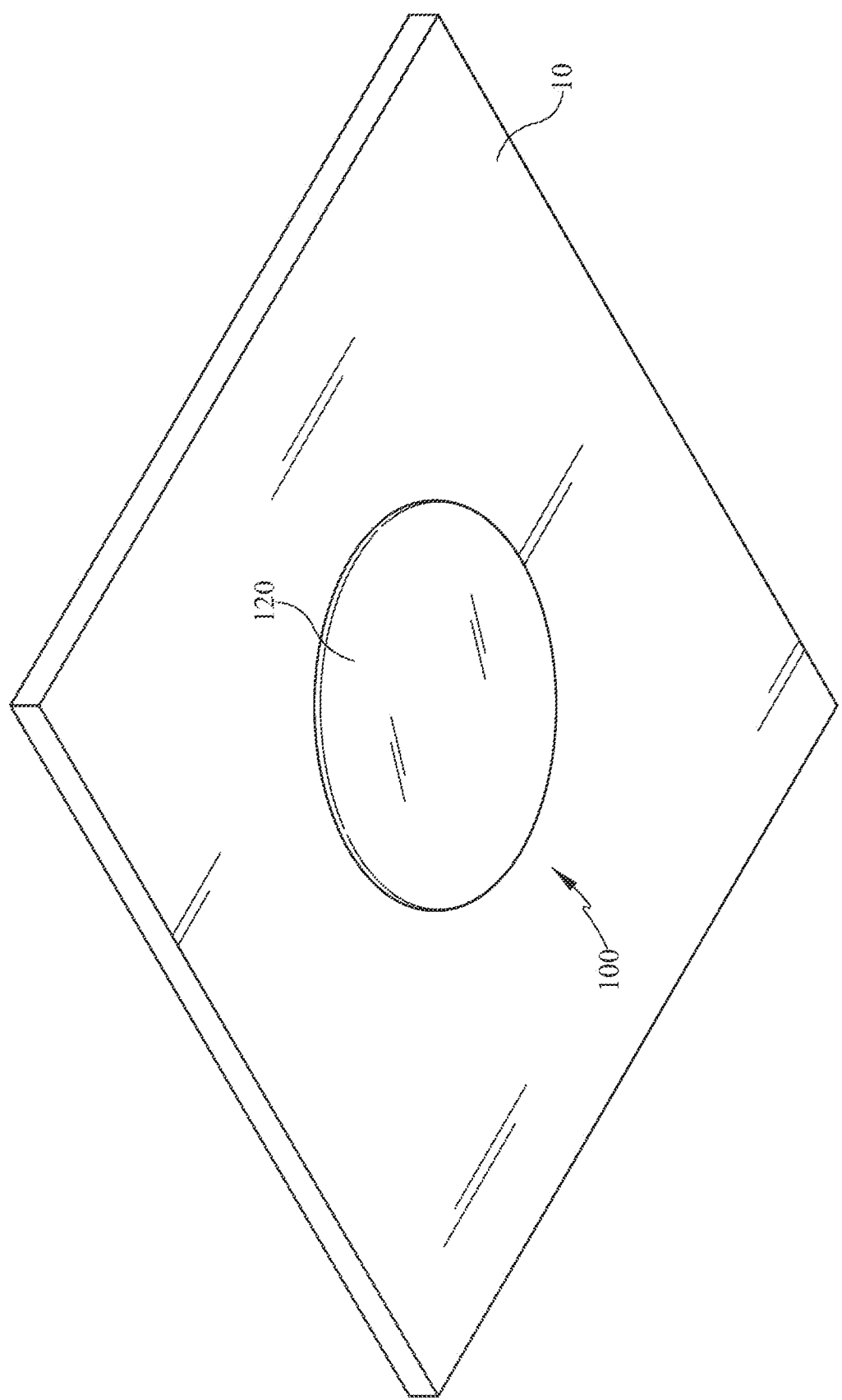
FIG. 7 is an interior room view of an installed trimless recessed light fixture of an embodiment of the present disclosure.
Figure 8:
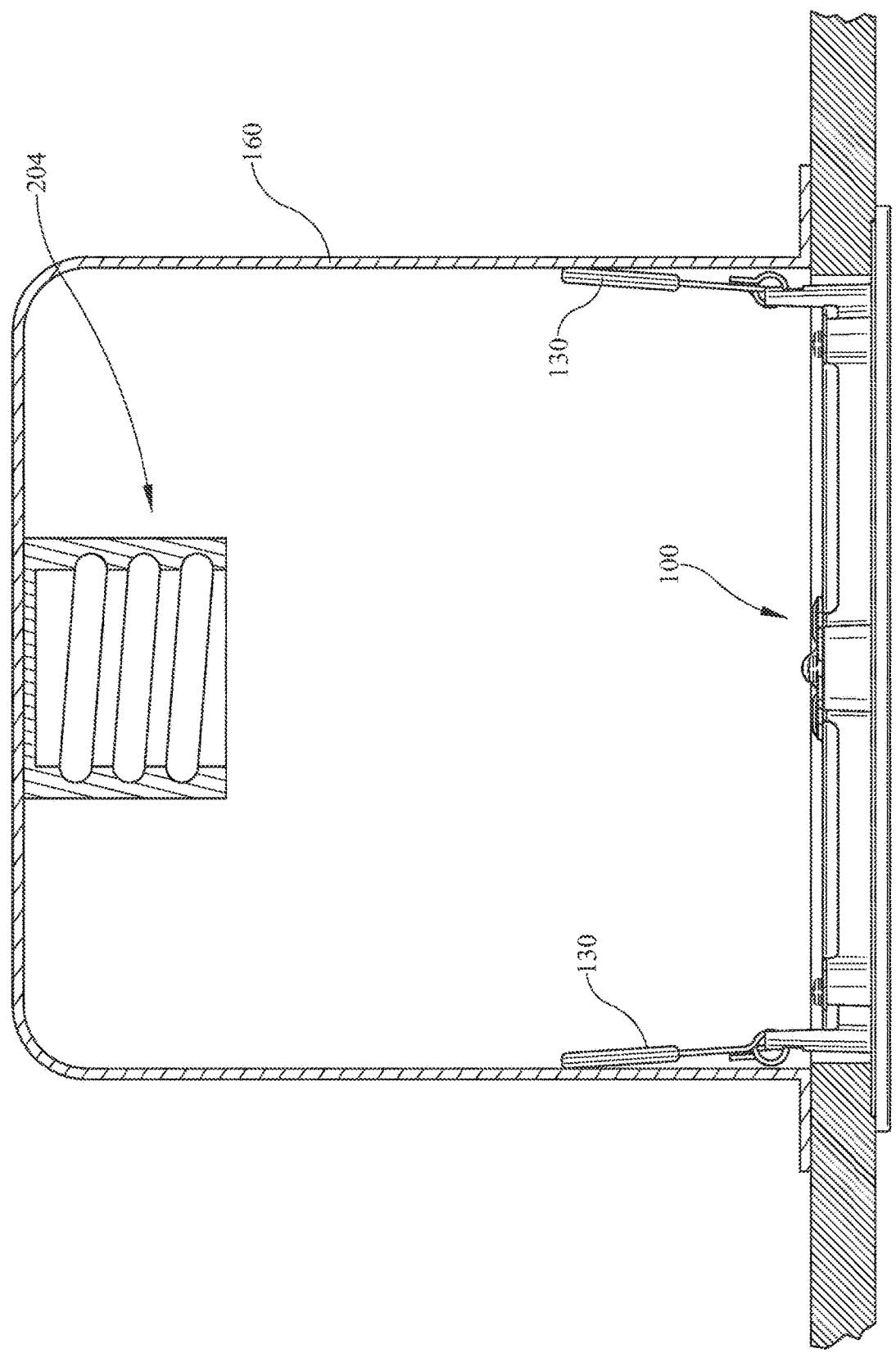
FIG. 8 is an side sectional view of an installed trimless recessed light fixture according to an embodiment of the present disclosure.
Figure 11:
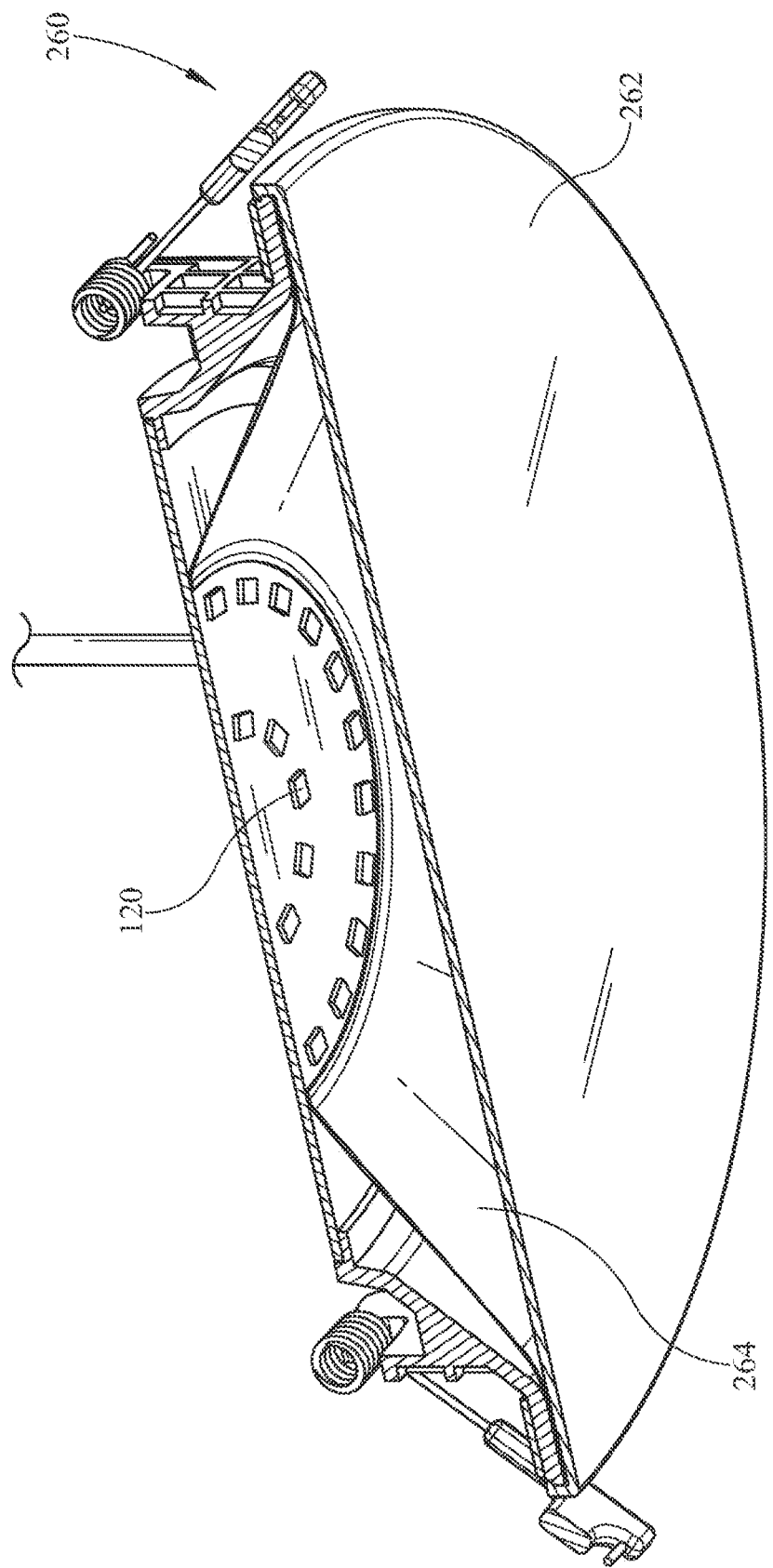
FIG. 11 is a lower section view of a further embodiment of the trimless light fixture disclosed herein with a diffuser in place.
Figure 12:
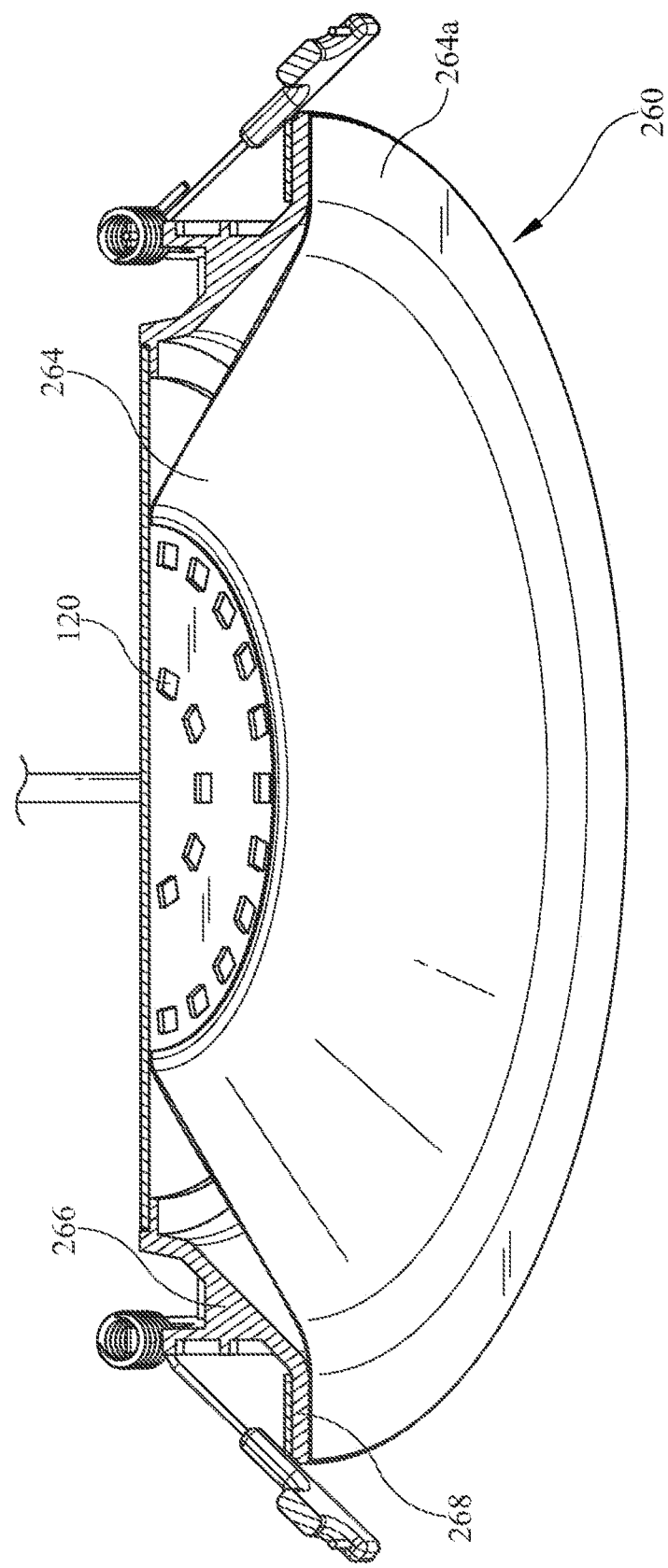
FIG. 12 is a further lower sectional view of a further embodiment with the diffuser removed.

The outer diffuser lens 102 which is positioned below the ring support 106 extends outward beyond the diameter of the ring support. For example, the ring support may be designed to fit within a standard 6 inch aperture formed in a ceiling and hence has an exterior diameter which is less than 6 inches. As shown in FIGS. 5, 7 and 8, the ring support 106 extends into the aperture formed in the ceiling to be retained therein. The diameter of the outer diffuser lens 102 extends beyond the diameter of the support ring as well as the aperture formed in the ceiling 10 so that it adequately covers the aperture formed in the ceiling. The trimless recessed light fixture 100 positions the lens 102 firmly against the ceiling 10 surrounding the aperture to provide an appearance of a smooth unitary illuminated lens structure without other structural discontinuity. For example, for a standard 6 inch recessed light fixture, a ceiling aperture size is typically a minimum of 6⅜ inches diameter. The outer diameter (the diameter of the outer side wall surface) of the ring support 106 therefor must fit within this expected aperture size formed in the ceiling. For example, the outer diameter of the ring support may be four to six inches. The diameter of the diffuser lens 102 is sized to properly cover the entire ceiling aperture. For example, the diameter of the diffuser lens may be 6½ inches or greater for such an embodiment.

Figure 6:
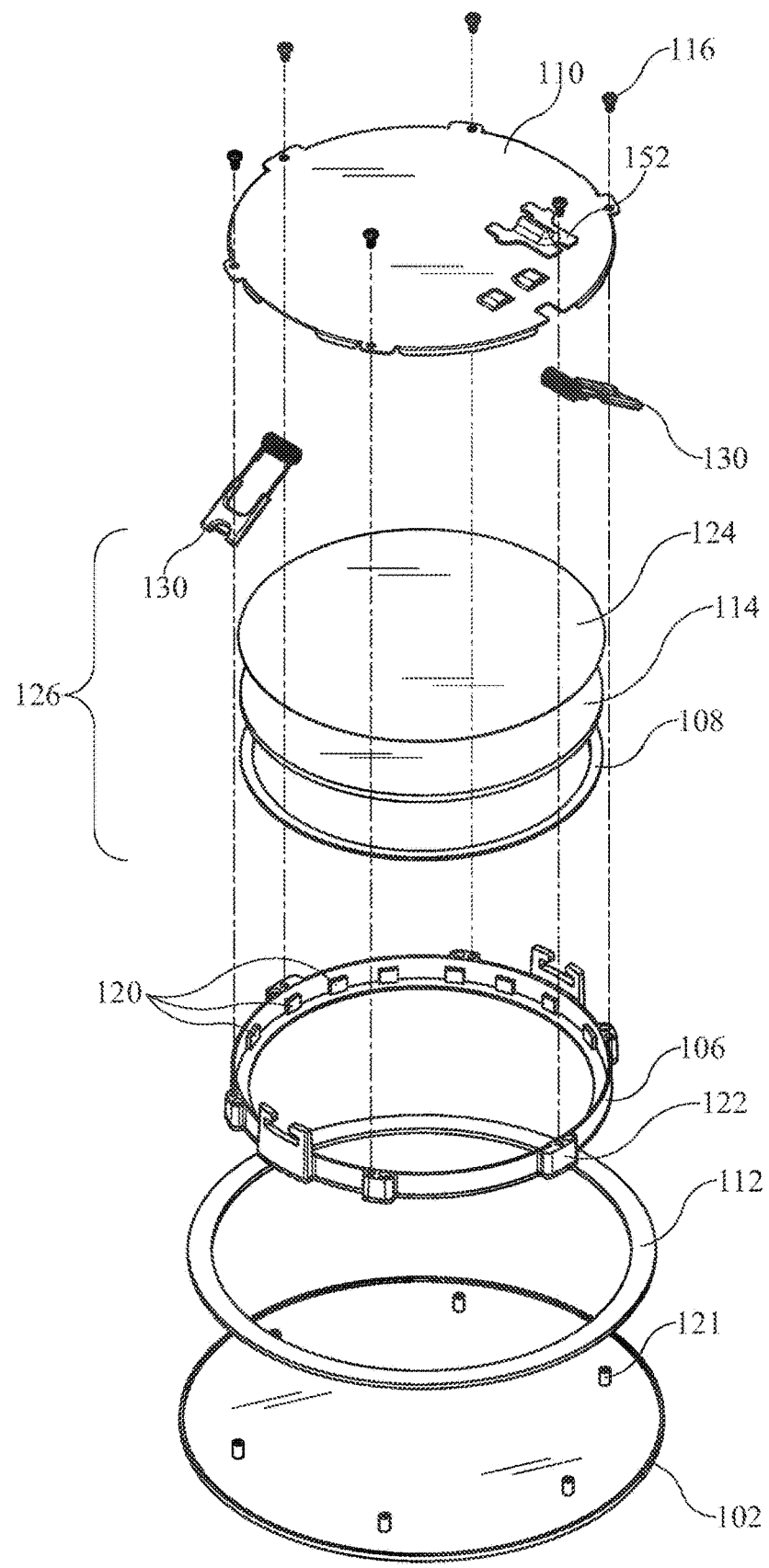
FIG. 6 is an exploded view of multiple optional parts of an embodiment of the present disclosure.

Diffuser lens 102 may include, in some embodiments, a plurality of retention pegs 121 as is shown in the example of FIG. 6. The retention pegs 121 may be utilized to frictionally and removably retain the lens 102 below the rings support 106. The individual retention pegs 121 may fit into apertures formed in the bottom of receiving brackets 122. Such pegs may be sized to provide adequate retention friction in order to maintain and support the position of the lens under the support ring so that it may be removably retained in place. Hence, in this example, the lens may be pulled away from the support ring and the ceiling aperture to gain access to the other elements of the trimless fixture 100. In other examples, the retention pegs 121 may be replaced with an adhesive or with mechanical retention members such as screws, fasteners or the like which permanently or semi-permanently affix the lens to the ring support.

The diffuser lens 102 may be polycarbonate diffusive material which is illuminated from above by the redirected light emitted from the LEDs and the light guide. The diffuser lens 102 may be designed to appear illuminated and at least partially transparent or translucent such that the edges of the ceiling aperture are not visible. Further, the lens 102 may appear to emit light substantially evenly along the entire surface area of the lens without discontinuity of any additional structure, such as trim pieces or other hardware typically found in recessed fixtures. This may be accomplished using known diffuser techniques such as light shaping/modification using specialized injection molded lenses. Other standard diffusers may be utilized to adequately cover the ceiling aperture. In some implementation, the lens 102 may include light carrier properties which allow light to travel along the entire surface area of the lens 102. For example, in some implementations the diffuser lens 102 may incorporate reflective elements internally to distribute light evenly along the entirety of the diffuser, even to those areas of the lens which are not directly below the light guide. For example, in some implementations light scattering elements may be provided internally within the diffuser to redirect light from substantially above to substantially through and downward, while also redirecting a portion of the light from the light guide outwardly towards the edges. In some implementations, these light scattering elements may be metallic reflective elements. In combination with such light scattering elements, the edge of the diffuser lens 102 may also allow light transmission to allow a small portion of light to be emitted laterally from the edges. Such redirection of light within the diffuser may allow the lens diffuser to give a smooth and continuously illuminated soft light across the entire surface area of the lens.

Lens 102 further may include, in some embodiments, a gasket along a top surface beyond the diameter of the ring support 106. Gasket 112 can compress against the ceiling once the trimless recessed fixture is installed to seal the space above the ceiling area from the interior of the room. Inclusion of the gasket 112 to circumscribe the ceiling aperture, regardless of the shape of the aperture or outer diffuser lens, allows the fixture 100 to adequately separate interior room air from the space above the ceiling. For example, in some implementations the outer diffuser lens may form a rectangular geometric shape while the aperture is circular and the gasket 112 may be provided to compress against the ceiling, circumscribing the ceiling aperture, independently of the shape of the outer diffuser lens.

Ring support 106 in various embodiments may also include spring retention brackets 132 to support spring clips 130. As shown in some of the embodiments, spring clips or other retention mechanisms 130 are held in opposing relationship and biased outwardly so that the trimless light fixture 100 can be positionally retained in the ceiling aperture. Spring clips 130 may, in some examples, frictionally retain the light fixture 100 by pressing directly against the upper surface of the ceiling, as depicted in FIG. 5. In other exemplary installations, the spring clips 130 may compress against the interior sidewall of a can light housing 160 as shown in FIG. 8. This is merely an exemplary depiction of a standard can light installation and removes other typically installed hardware such as baffles, internal can fixture housings and similar associated fixture installation components. For example, in a retrofit installation, the spring clips may simply compress against a pre-existing interior wall housing positioned on the installed interior of the recess can hardware. Alternatively, in a new installation, the spring clips or other retention members may be utilized to maintain the position of the light fixture 100 into the ceiling aperture. In even further embodiments, the light fixture 100 may be affixed directly to a junction box 204 support bracket. For example, the junction box 204 may be mounted directly over the ceiling aperture and have an interposed mounting bracket which are well known in the art. The light fixture may be directly attached to the junction box after electrical connectivity is accomplished.

Other retention mechanisms 132 may be utilized to functionally retain the light fixture over the ceiling aperture. Further, placement of the retention mechanisms may be at various locations. For example, in some implementations the ceiling aperture may be formed directly under a junction box 204 and the fixture is directly attached to a lower attachment bracket of the junction box as are readily known in the art. In such implementation, screws or other retention elements may be utilized to affix the lighting fixture to the junction box after electrical connection. For example, some of the brackets or additional brackets on the top surface of the top plate 110 may be utilized to affix the fixture 100 to the junction box. Also, in some implementations, the retention mechanisms may extend directly from a portion of the outer diffuser or lens which extends upward into the ceiling aperture or which may form part or all of the ring support. For example, the retention member may extend upward from an integral ring support and outer diffuser/lens. Alternatively, in other examples, the retention members may be additional brackets which extend upwards into the ceiling aperture from alternative or added structure.

Alternatively, as depicted in the embodiment of FIG. 4A, the outer diffuser 102 may affix to the ring support bottom flange area of the ring support 106a. The bottom flange area of the ring support 106a extends from the outer periphery along the snap bead 102a of the diffuser inwardly below the lens stack 126 towards the inner periphery 107a to the upturned edge 103. In such implementations, the diffuser 102 may incorporate a bead 102a which snaps over the upper lip of the ring support bottom flange on ring support 106a. Bead 102a allows the diffuser to be snapped into place and retained below the lens stack 126. The outer diffuser reduces the potential brightness of the LEDs and evens the illumination out from the fixture embodiment 100a. Further, in some implementations, the ring support bottom flange 106a may include an inner periphery 107a which has an upturned edge 103 which extends inwardly and upwardly towards the lens stack 126 and away from the diffuser 102. By providing an upturned edge away from the diffuser 102, the appearance of the diffuser from below is evened out without shading or bright spots. By implementing the upturned edge 103 away from the diffuser 102, the appearance of dark circular areas through the diffuser may be minimized.

As well in some implementations as depicted in FIG. 4A, the ring support side wall 106a of some embodiments of a fixture 100a may include other features to reduce shadows or shading of the diffuser 102. For example, while including a lip to receipt snap bead 102a, openings or other discontinuous structure may be utilized in the annular area below the sidewall 106a to allow for illumination and reduce shadows. Upturned edge 103 however pulls away the continuous interior surface of the bottom flange and further reduce potential appearance of the structure through the diffuser.

FIGS. 9 and 10 show even further embodiments and implementations of a light fixture incorporating at least some of the features described herein. FIG. 9 depicts an outer lens 202 on the fixture 220 which is integrated with the ring support and also affixed to a top wall or top cover 210 which supports an LED 120 along the inner surface of the top wall 210. The LEDs illuminate the outer diffuser/lens 202 from above. The LEDs output may be more readily controlled via the controller/microprocessor since they are directly above the lens 202. For example, the controller may adjust color temperature or intensity to prevent a glare from the LEDs. Or the diffuser qualities of the lens 202 may be sufficient to diffuse the brightness of the LEDs.

Direct illumination of the diffuser from above, or back lighting, may increase intensity output of the fixture 220 since the outer lens/diffuser 202 is being illuminated directly from behind. Also, allowing the outer lens/diffuser 202 to be the main body/housing for support of the entire structure simplifies the overall construction. As shown the diffuser is attached to the top wall 210 which is a metal back plate or cover which may further act as a heat sink for the LEDs. Similar to the other embodiments, a gasket 212 may be provided allowing the interior area of the lens to seal against the ceiling and around the ceiling aperture once installed.

A further implementation of the embodiments is shown in FIG. 10 wherein a COB light source 242 is implemented for back lighting of the outer lens/diffuser 252. The light fixture 240 may incorporate controllers and other needed circuitry directly on the back or top plate 250. The integrated outer lens 202 and ring support 206 provides adequate separation between the LEDs and the diffuser 252.

Other implementations of backlit LED illumination for recessed fixtures are also depicted in FIGS. 11-14. For example, a backlit recessed fixture 260 may include a plurality of LEDs 120 spaced from the outer diffuser 262 at a predetermined distance. Extending from the top wall 210 of the ring support housing 266 and LEDs 120 is a reflector positioned to evenly distribute the light from the LEDs to the diffuser 262. The reflector 264 may be a conical reflector to evenly distribute output of the LEDs 120 across the lens/diffuser 262. Conical reflector 264 spreads light outward from the centralized positioning of the LEDs towards the outer peripheral edge of the side wall housing rim 268.

Ring support housing 266 of the recessed fixture 260 may be separated from the lens 262 by a sufficient depth/height such that the output of the LEDs is spread evenly across the diffuser. In some implementations, the reflector 262 is a conical reflector. In still further embodiments, the sidewall of the reflector may be outwardly curved, straight or incorporate combinations for even illuminations. For example, in some implementations, a reflector sidewall may include light collection zones and reflection zones.

Figure 13:
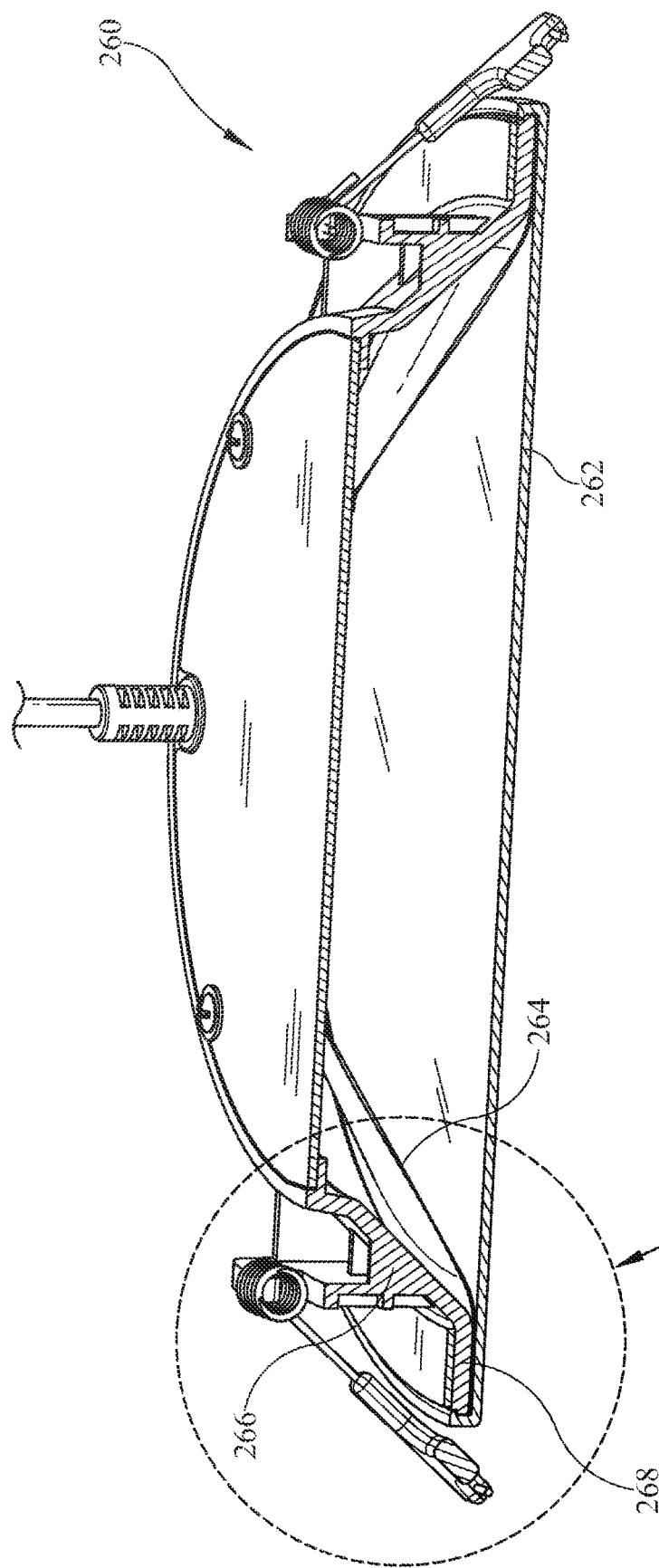
FIG. 13 is an upper section view of an additional example of the light fixture disclosed herein.
Figure 14:
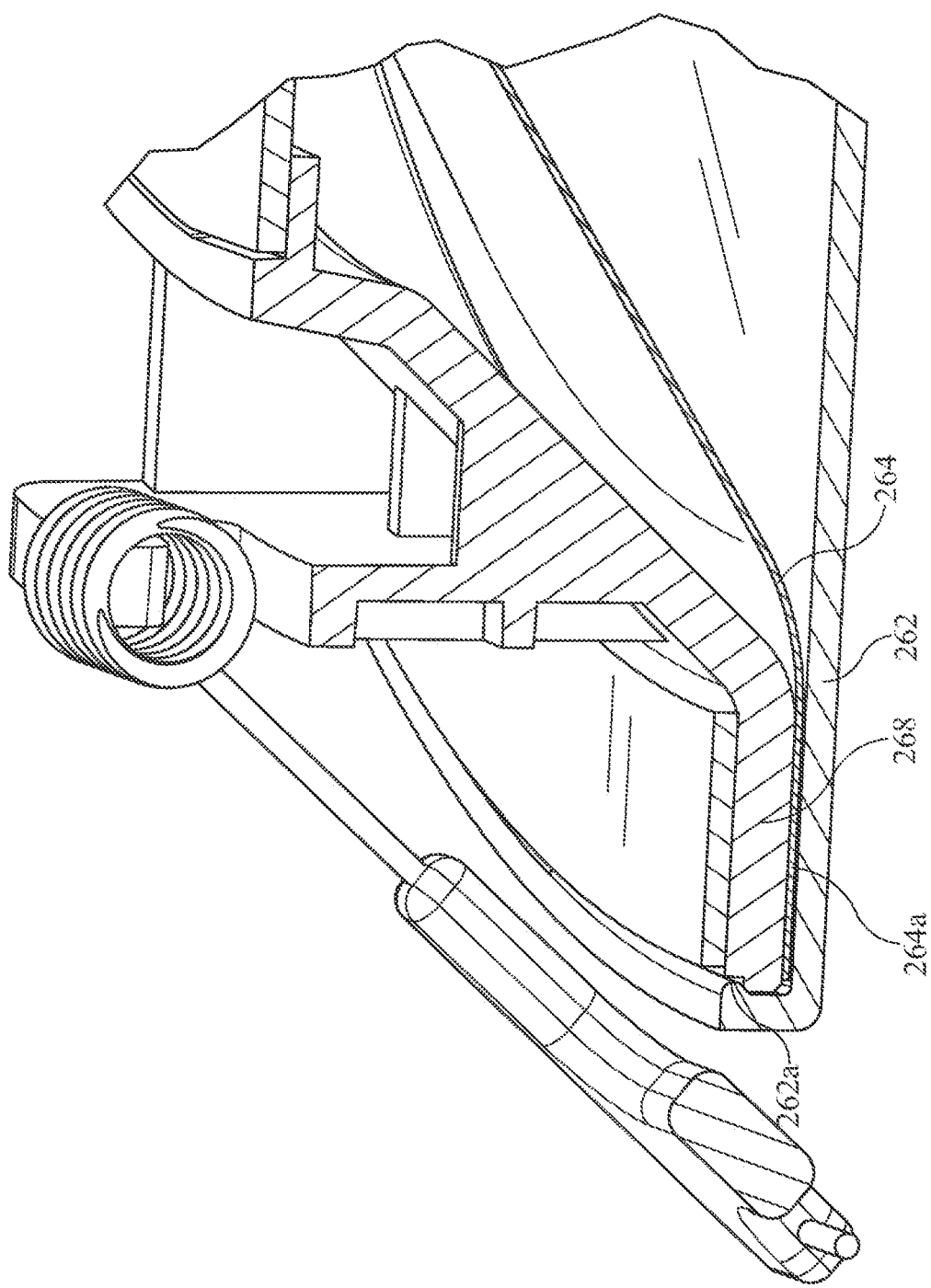
FIG. 14 is a close-up sectional view of aspects of FIG. 13.

In some additional implementations, the reflector 264 may extend outwardly to a flat outer rim 264a for positioning between the fixture housing rim 268 and the outer edge of the diffuser 262. As depicted in the implementation of FIG. 13, the diffuser 262 sandwiches the annular reflector flat outer rim 264a between the housing rim 268 and the diffuser. As further previously described, the diffuser may include a snap bead shown in FIG. 14 and other implementations to ride over the upper peripheral edge of the housing rim 268. By securing the annular flat outer rim 264a of the reflector between the annular housing rim 268 and the diffuser, the outer peripheral edge of the reflector may be maintained in proper position from the top edge against the top wall of the fixture and downward to the outer edge. Such positioning allows continuous even illumination of the diffuser and prevents shifting of the reflector 264 during installation.

Ring support 266 may be a sidewall conically extending from the top wall downward to a ring support rim 268 in some implementations. In still further embodiments, the ring support 266 may be about perpendicular from the ring support rim extending to the top wall, or may be a combination of an angled sidewall vertical or may include combinations of stepped side walls to extend to an outer edge. For example, in some implementations the diameter of the annular area defined by the top wall where the LEDs 120 are mounted may be much smaller than the diameter of the annular housing rim 268.

In even further embodiments, spring clips may be affixed to the ring support as in discussed embodiments to engage with the upper surface of a ceiling upon installation of the recessed fixture through an aperture in the ceiling. The spring clips can be a first and a second spring clip on opposing sides of the ring support.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

The invention claimed is:
1. A trimless recess light fixture, comprising:
 an outer lens having a first outer diameter;
 a ring support affixed to a top side of the outer lens and having a second outer diameter less than the first outer diameter of the outer lens;
 the ring support having an inner surface supporting a plurality of LEDs;

the ring support having an inwardly directed ledge below the plurality of LEDs;

an optic stack on the inwardly directed ledge, the optic stack including:
a diffuser;
a light guide;
a reflector;

the plurality of LEDs positioned on the inner surface in optical alignment with the light guide and wherein the reflector redirects light from the light guide through the diffuser; and the ring support having at least one retention mechanism.

2. The fixture of claim 1, wherein the ring support is an intermittent wall portion.

3. The fixture of claim 1, wherein the plurality of LEDs are regularly positionally circumscribing the ring support.

4. The fixture of claim 1, wherein the plurality of LEDs are electrically connected to an LED controller.

5. The fixture of claim 1, wherein the plurality of LEDs are electrically connected to a remote power source.

6. The fixture of claim 1, wherein the ring support is a heat sink and is thermally connected to the plurality of LEDs.

7. The fixture of claim 1, further comprising a top cover mechanically retained on the ring support.

8. The fixture of claim 1, wherein the outer lens has a plurality of retention pegs extending towards the ring support, the ring support having a plurality of brackets, each of the plurality of brackets frictionally retaining one of the plurality of retention pegs.

9. The fixture of claim 5, wherein the remote power source is electrically connected to a screw-in bulb electrical connector.

10. The fixture of claim 5, wherein the remote power source is electrically connected to a junction box connection.

11. The fixture of claim 1, wherein each of the plurality of LEDs have a light output characteristic, the light output characteristic controlled by a micro-controller.

12. The fixture of claim 11, herein the light output characteristic includes at least luminosity.

13. The fixture of claim 1, wherein the at least one retention mechanism includes a first and a second spring clip.

14. The fixture of claim 1, wherein each of the plurality of LEDs are electrically connected to a power bus extending along the inner surface of the ring support.

15. The fixture of claim 1, wherein the outer lens is positioned for installation below an aperture formed in a ceiling, the ring support positioned for installation within the aperture.

16. The fixture of claim 1, wherein the diffuser, the light guide and the reflector of the optic are stacked together by an adhesive.

17. The fixture of claim 1, wherein the light guide includes extraction features to redirect light towards the diffuser.

18. A trimless recessed light fixture, comprising:
an outer diffuser having a top surface and a first outer diameter;

a ring support attached to the outer diffuser and having a second outer diameter less than the first outer diameter of the outer diffuser;

the ring support having an inner surface supporting a plurality of LEDs, the plurality of LEDs electrically connected to a power supply;

an optic stack supported by a ledge of the ring support, the optic stack including:
a light guide;
a reflector;

the plurality of LEDs positioned on the inner surface in optical alignment with the light guide along an outer circumferential surface of the light guide and wherein the reflector redirects light from the light guide through the outer diffuser;

the recessed light fixture having a least one retention mechanism to suspend the trimless recessed light fixture from a ceiling surface; and wherein the outer diffuser is illuminated by the plurality of LEDs and is configured for sealingly being engaged along the top surface of the outer diffuser against the ceiling surface.

19. The fixture of claim 18, further comprising:
a circumferential gasket along the top surface of the outer diffuser, the circumferential gasket positioned to abut the ceiling surface below a ceiling aperture which receives the ring support and circumscribes the ceiling aperture.

20. A trimless recessed light fixture, comprising:
an outer diffuser having a first outer diameter;

a ring support attached to the outer diffuser and having a second outer diameter less than the first outer diameter of the outer diffuser;

the ring support having an inner surface supporting a plurality of LEDs;

the plurality of LEDs emitting light through the outer diffuser; and the outer diffuser having a circumferential gasket positioned to abut a ceiling surface below a ceiling aperture and circumscribe the ceiling aperture which receives the ring support, wherein the circumferential gasket has a third outer diameter greater than the second outer diameter of the ring support.

* * * * *